US007496680B2

(12) United States Patent
Canright

(10) Patent No.: US 7,496,680 B2
(45) Date of Patent: Feb. 24, 2009

(54) METHOD FOR ROUTING MESSAGES FROM A SOURCE NODE TO A DESTINATION NODE IN A DYNAMIC NETWORK

(75) Inventor: Geoffrey Canright, Oslo (NO)

(73) Assignee: Telenor ASA, Fornebu (NO)

( * ) Notice: Subject to any disclaimer, the term of this patent is extended or adjusted under 35 U.S.C. 154(b) by 151 days.

(21) Appl. No.: 10/534,929

(22) PCT Filed: Nov. 13, 2003

(86) PCT No.: PCT/NO03/00385

§ 371 (c)(1), (2), (4) Date: Aug. 31, 2005

(87) PCT Pub. No.: WO2004/045166

PCT Pub. Date: May 27, 2004

(65) Prior Publication Data

US 2006/0031576 A1    Feb. 9, 2006

(30) Foreign Application Priority Data

Nov. 13, 2002    (NO)    ................................ 20025428

(51) Int. Cl.
  *G06F 15/173*    (2006.01)
  *H54Q 7/00*    (2006.01)
(52) U.S. Cl. ...................................... 709/238; 370/331
(58) Field of Classification Search ................ 709/238, 709/239, 240, 241, 242, 243; 370/331
  See application file for complete search history.

(56) References Cited

U.S. PATENT DOCUMENTS 5,987,011 A * 11/1999 Toh ............................. 370/331

6,618,761 B2 * 9/2003 Munger et al. .............. 709/241
6,721,800 B1 * 4/2004 Basso et al. ................. 709/239

OTHER PUBLICATIONS

S. Ramanathan et al., "A Survey of Routing Techniques for Mobile Communications Networks", Mobile Networks and Applications, vol. 1, No. 2, 1996, pp. 89-104.
J. Broch et al., "A Performance Comparison of Multi-Hop Wireless Ad Hoc Network Routing Protocols", Proc. MobiCom '98, Dallas, TX, USA, 1998.
E.M. Royer et al., "A Review of Current Routing Protocols for Ad Hoc Mobile Wireless Networks", IEEE Personal Communications, Apr. 1999, p. 46-55.
An electronic overview by Christian Tschudin of Uppsala University at: http://www.docs.uu.se/tschudin/lect/20002001/dn2/slides/adhoc-4up.pdf, 8 pages.
Internet printout: "Mobile Ad-hoc Networks (manet)" at http://www.ietf.org/html.charters/manet—charter.html, 3 pages.
P. Gupta et al., "A System and Traffic Dependent Adaptive Routing Algorithm for Ad Hoc Networks", Proceedings of the 36th IEEE Conference on Decision and Control, San Diego, Dec. 1997, pp. 2375-2380.
S.R. Das et al., "Performance Comparison of Two On-Demand Routing Protocols for Ad Hoc Networks", IEEE Personal Communications, Feb. 2001, 10 pages.

* cited by examiner

*Primary Examiner*—Joseph E Avellino
*Assistant Examiner*—Jeong S Park
(74) *Attorney, Agent, or Firm*—Schneck & Schneck; Thomas Schneck

(57) ABSTRACT

A method for updating routing tables in ad-hoc networks (AHN), such as networks including mobile nodes communicating via wireless links, is disclosed. The method utilizes both stochastic and empirical information for updating routing tables at loss or gain of neighbor nodes.

10 Claims, No Drawings

METHOD FOR ROUTING MESSAGES FROM A SOURCE NODE TO A DESTINATION NODE IN A DYNAMIC NETWORK

FIELD OF THE INVENTION

The present invention applies to the problem of routing in ad-hoc networks (AHN). Such networks may consist of mobile nodes, which communicate via wireless links.

BACKGROUND OF THE INVENTION

Communication in AHN may take place directly between two mobile nodes, if they are within an appropriate range of one another. More common is the case of multi-hop routing, in which nodes lying between the source node S and destination node D serve as routers, conveying data from source to destination via multiple hops. It is technically challenging to find such multi-hop paths, since the topology of the AHN is constantly changing due to the motion of the nodes. Thus it is, in general, challenging to route messages between nodes in an AHN.

It should be noted that routing from a mobile node to a gateway node G (which is usually fixed in place) is also of significant interest. The gateway node then gives access from the mobile AHN to a fixed network. Node-gateway routing can in principle include the multi-hop case, in which (again) intermediate mobile nodes serve as routers passing data to and from the gateway.

The phrase "multi-hop routing in an ad-hoc network" can be used to apply to either of these two cases (mobile mobile and mobile gateway).

The problem is to find good paths between pairs of nodes in an AHN that wish to communicate. There are various criteria for "good" paths. The path must be feasible (that is, it must not be based on outdated topology information, which uses links that no longer exist). The path should also be as short as possible to minimize the use of bandwidth for relaying; and it should avoid congested areas which give rise to undesirable delay in the passing of data.

Depending on the circumstances and the application, there can be other criteria for goodness of a path. The present invention is useful for any criteria of goodness, as long as these criteria can be measured in the course of the transmission of the data along the path. The criteria mentioned above (existence, length, and delay of the path) are all measurable.

Finding good paths is a readily soluble problem for a fixed, static network. When the network topology is time dependent, entirely new problems arise. For a realistic and practical span of node mobility and wireless communications range, the network topology of an AHN can change more rapidly than traditional methods, used for static networks, can follow. Hence new path-finding (routing) methods must be found for such dynamic networks.

Routing in AHN has been studied intensively over the last 10-15 years. The number of proposed routing protocols for an AHN is very large, and it is not practical to try to list them all here.

Some overviews of ad-hoc routing protocols include the following:

S. Ramanathan and M. Steenerup, "A survey of routing techniques for mobile communications networks", Mobile networks and Applications, vol. 1 no. 2, p. 89, 1996.

J. Broch, D. A. Maltz, D. B. Johnson, Y.-C. Hu, and J. Jetcheva, "A performance comparison of multi-hop wireless ad hoc network routing protocols", Proc. MobiCom '98, Dallas, Tex., USA, 1998.

E. M. Royer and C.-K. Toh, "A review of current routing protocols for ad hoc mobile wireless networks", *IEEE Personal Communications*, April 1999, p. 46.

An electronic overview by Christian Tschudin of Uppsala University is at:

http://www.docs.uu.se/tschudin/lect/2Q002001/dn2/slides/ad hoc-4up. ndf.

There is also a working group of the Internet Engineering Task Force (IETF), which is dedicated to Mobile Ad-hoc Networks or MANETs. See:

http://www.ietf.org/html.charters/manet-charter.html.

Further, stochastic routing has been proposed for routing in fixed (but dynamic) networks in numerous research papers. There is one research paper describing a specific stochastic routing scheme for ad-hoc networks: P. Gupta and P. R. Kumar, "A system and traffic dependent adaptive routing algorithm for ad hoc networks, *Proceedings of the 36th IEEE Conference on Decision and Control*, pp. 2375-2380, San Diego, December 1997.

Stochastic routing is a form of multipath routing. In multipath routing, nodes maintain routing tables (RTs) with multiple choices of path for each possible destination. For dynamic networks it is advantageous to maintain multiple paths, as it allows for rapid change of path in case the first choice of path fails. Stochastic routing entails the maintenance of information about multiple paths, and also that the choice among multiple paths be made probabilistically rather than deterministically. Thus stochastic routing necessarily involves the following elements: each node S. viewed as a source of data, maintains an RT for every possible destination D. Each such RT has an entry for every neighbor k of S with a probability $p(k, D)$. Thus, whenever data are to be sent from S to D, neighbor k is chosen with probability $p(k,D)$.

Most ad-hoc routing protocols attempt to find a full path from a first node S to a second node D before sending data. There are two broad categories for protocols doing this:

Proactive protocols: These protocols attempt to maintain a complete routing solution for the entire network at all times. In this sense, they are like those approaches used for routing on a static network, although they are of course adapted to better deal with the dynamic nature of the AHN. These protocols are also known as "table-driven," since they attempt to maintain information amounting to a complete set of routing tables for all S-D pairs.

Reactive protocols: These protocols attempt to find paths from S to D only when the source S needs to send data to destination D. They are also known as "source-initiated" or "on-demand" protocols. A recent evaluation of two of the most prominent on-demand protocols is: C. E. Perkins, E. M. Royer, S. R. Das, and M. K. Marina, "Performance comparison of two on-demand routing protocols for ad-hoc networks", *IEEE Personal Communications*, February 2001, p. 16.

There are ad-hoc routing schemes that do not need to find a full path before sending data. Such schemes use one or both of the following mechanisms:

Hierarchical protocols: the network is broken up into clusters. Routing within a cluster is done by any of the above-mentioned non-hierarchical methods. However, routing to a node outside S's cluster is done by sending the data to a designated gateway node. (Here the gateway is to another cluster, not to a fixed net; the gateway nodes are also mobile nodes.) Data are then passed from cluster to cluster via the gateway nodes that must solve the intercluster routing problem until it reaches the cluster in which D lies. Then the data are routed to D using the intracluster protocol. Such hierarchical routing mimics that used for the static Internet.

Location-aided protocols: If S knows its own geographic location, as well as that of D, it can send data in the direction of D without knowing a complete path to D. The challenge is then to maintain up-to-date information on the location of possible destination nodes, which are mobile. If the destination node is a fixed gateway node G (giving access to a fixed net), then this challenge is trivial and one needs only to equip each mobile node with positioning technology.

There is probably no unique best solution to the problem of multi-hop routing on an ad-hoc net. Such networks can vary widely in the mobility of the nodes and in the pattern and volume of internode traffic. Each different type of routing scheme has its own weaknesses as described below.

Proactive protocols: Such protocols obviously work best when the network topology is slowly varying. By the same token, when the network is too dynamic (e.g., because the nodes are too mobile) these protocols swamp the network with overhead messages, seeking to hold the full set of routing tables updated in the face of too much time variation of the network. That is, these protocols fail when the network topology changes too often—typically because the node mobility is too high, and/or the network is too large. In short, the principle problem with proactive protocols is the large routing overhead incurred for dynamic networks.

Reactive protocols: These protocols seek routes only when they are needed, thus reducing their routing overhead with respect to proactive protocols. That is, their routing overhead grows with network traffic rather than with network transience. These schemes can thus work well for a highly dynamic network, as long as the traffic rate is not too high. For this reason they tend to be preferred over proactive protocols.

Reactive protocols fail when the rate at which paths must be found exceeds the rate at which they can be found. This occurs due to high traffic (which increases the former rate), high network transience (which increases the former rate and decreases the latter), or large network size (which decreases the latter rate). They are particularly vulnerable to the latter factor: if the network grows too large, then the time needed to find paths on demand can exceed the time for which the path is valid—at which point routing becomes impossible.

Of course, there is no AHN routing scheme which can handle an arbitrarily large network. However, the need to find an entire path in real time is a significant bottleneck for both of these classes of protocols-reactive and proactive.

Hierarchical protocols: These schemes avoid the need to find an entire path before sending data. However, they face problems similar to those faced by proactive schemes—that is, they fail for networks that are too large and/or too dynamic. The reason is that they must repeatedly solve a network-wide problem: the choice of how to cluster the nodes into a hierarchy, and how to route between the clusters. For some mobility patterns (say, when nodes tend naturally to move in clusters), the solutions to this global problem will not vary too rapidly. However, for the general AHN, with highly mobile nodes moving in an uncorrelated fashion, a hierarchical scheme will incur unacceptable overhead costs, particularly if the network is large.

Location-aided protocols: These protocols largely avoid the overhead problems of the above-mentioned types, as they simply need to know the location of their destination in order to send data. They then have two weaknesses. First, it can be difficult to obtain good enough information about the location of the destination. The source does not need exact knowledge of D's location, and so such schemes can work with partly-outdated information. Furthermore, regular communication with D serves to keep its location updated. Hence a problem arises only when nodes communicate in an irregular fashion (over time) with a number of different nodes, which are also far away geographically.

A second problem with location-aided routing schemes is that they naturally rely on "aiming" the data towards D. That is, the next hop is chosen to be that neighbor closest to D. The problem arises when data arrive at a node that cannot reach D directly and which also has no neighbor which is closer to D than it is itself. Such a node represents a "dead end" for this type of routing scheme, which thus must be augmented with some mechanism for routing around dead ends. Dead ends are most likely for AHNs with a low and/or very uneven density of nodes.

Finally (as noted above), note that routing to a fixed gateway node has only the second of these two problems since the location of the destination G is always known.

SUMMARY OF THE INVENTION

It is an object of the present invention to provide a method that eliminates the drawbacks described above.

For this end, the present invention discloses a method for routing messages from a source node to a destination node in a dynamic network, said source node including a routing table, each row in the routing table representing a possible destination node for a data message transmitted from the source node, and each row in the routing table including one probability value for each neighbor node of the source node, the method including to update the probability values with quality measurements taken each time a message is sent from the source node to a destination node, routing a predefined percentage of the messages by choosing the neighbor node with the highest probability value in the row for a destination node in the routing table, and routing the other messages by distributing the messages among the neighbor nodes according to the probability values given in the same row in the routing table.

However, the exact scope of the invention is evident from the appended patent claims, which includes several preferred embodiments.

DETAILED DESCRIPTION

As earlier mentioned, in general, it is challenging to route messages between nodes in an AHN. It is to this routing problem the present invention is addressed, in particular to multi-hop routing in an ad-hoc network.

As earlier mentioned, stochastic routing has been proposed for routing in fixed (but dynamic) networks in numerous research papers and a form of stochastic routing for AHN has been proposed in Gupta et al.

The present invention employs stochastic routing for AHN. It involves the use of the data packets themselves as a means for updating the nodes' routing tables (RTs), with a novel mixture of stochastic and deterministic routing for the data. The present invention also includes a novel method for updating RTs in the event of the establishing of a new link.

Every stochastic routing scheme needs a method for updating the RT probabilities (also called "weights"). In this proposed invention, each time a message is sent from S to D, it will measure the quality of the path taken. The quality measure may be number of hops, time delay, or other measures, or a combination of these. The method proposed here can be used for any such quality measure, as long as it is measurable. The quality measure for the path, along with the actual path taken, is then carried along with the data packet. This information represents a small amount of overhead included with the sending of data.

RT updates are then performed as follows. If the links in the network are symmetrical, then the message can update RTs pointing towards S at each node N visited on the path since, by symmetry, the quality of the S-N path is the same as the quality of the N-S path, so that the former can be used to update N's RT for destination S.

If the links are not symmetrical, then the message arrives at D with information on the quality of the S-D path taken, plus a measure of the quality of all intermediate paths of the form S-N. This information is then sent back to S via a small, high-priority routing packet and used to update the RTs at S for all nodes used in the path. Hence, this method requires that nodes have a mechanism for prioritizing packets, so that these return routing packets can be given high priority. This in turn prevents the information they convey back to S from becoming obsolete.

The measured quality of a path may be termed $\delta$. Let $p(k,D)(\text{old})$ be the probability in the RT towards D via k before updating. Then the updated value is $$p(k, D)(\text{new}) = \frac{p(k, D)(\text{old}) + \delta}{1 + \delta}$$

for the case that neighbor k was used in the path. The remaining entries j for destination D are corrected to hold the probability sum to one:

$$p(j, D)(\text{new}) = \frac{p(j, D)(\text{old})}{1 + \delta}$$

This gives a general method for updating the weights in the RTs. The specific method for determining the update weight $\delta$ depends on the quality measure to be used. It can also be adjusted to force the network to adapt more quickly, or less quickly, in order to tune the performance of the method. These details are not specified in this invention, as this part of the updating procedure is not different from known methods for static networks.

According to a preferred embodiment of the invention, every message is used as a source of updating information for the stochastic RTs. Hence, this method naturally adjusts the updating rate according to the traffic rate: at high traffic, RTs are frequently updated, and are hence likely to be reliable.

There is another updating mechanism proposed in this invention, which is independent of traffic rate, but instead is triggered by changes in network topology. This second mechanism thus keeps RTs updated even at low traffic rates, while playing a minor role at high traffic rates.

The second updating mechanism is initiated by any node j when that node detects a change in its neighbor set NS(j). The set of neighbors for a node using wireless links is something to be decided by an algorithm that adjusts power level in order to maintain connectivity, while attempting to hold interference among the various links as low as possible. There is a number of such algorithms in use for AHNs. The present invention does not specify this algorithm. What is specified is a rule for responding to a change in the NS. Here there are two possible cases: (a) a neighbor is lost; and (b) a neighbor is gained.

a) Loss of a neighbor: Suppose node j has lost its connection to neighbor k. There are then two tasks to be performed: (i) the RTS for all destinations D must be adjusted to reflect the removal of neighbor k. (ii) Node j must build a set of weights (i.e., a new row in its RT) specifying how to route to k, since k is no longer a one-hop neighbor.

(i) For every destination D, the weights for the remaining NS of j must be adjusted so as to sum to one. It is proposed in this invention to adjust these weights in such a way that they retain the same relative weight that they had before the loss of neighbor k. This rule is motivated by the fact that loss of neighbor k has not provided any new information about the relative goodness of the remaining paths to D.

(ii) Node j must wait a (tunable) time interval $\Delta t(1)$ after detecting loss of neighbor k. If connection to k has not been re-established after this time, and if node j has not attempted to send any data to k in that time, then node j shall emit a "dummy" message whose sole purpose is to provide needed routing information between j and k. The RT of j towards k is initially set to equal weights, that is all neighbors of j are taken to be equally likely to provide a path to k. Hence, the dummy message emitted by j will choose outgoing neighbors of j with equal probability in its search for k. Subsequent nodes in the path will have routing information towards k; here the dummy message will choose the highest-weight path for its next hop along the way to k. For symmetric links, the dummy's quality measure can be used to update the RT (towards j) of each node visited along the way to k (including k itself). For either symmetric or asymmetric links, upon reaching k, the dummy triggers a high-priority routing packet, which returns to j with a quality measure which can be used to update j's RT towards k. If j has not received such a confirmation after a (tunable) time $\Delta t(2)$ since the emission of the dummy, j will emit another dummy. Thus, j will continue to emit dummies, seeking the lost neighbor k, until it succeeds. Note that with high probability for asymmetric links, and with 100% probability for symmetric links, when j loses k as a neighbor, k also loses j, and so begins emitting dummies seeking j. The result of step (ii) is then that j and k have re-established up-to-date routing information connecting the two nodes.

b) Gain of a new neighbor: Suppose j has gained a new neighbor w. Now there is only one task to be done, since the analogue of (ii)—finding the lost neighbor—is not needed here. The task is then to adjust j's RT for all possible destinations D (other than w), given that j has acquired a new neighbor. It is desirable to use the routing information stored in j's RTs, and also to use the routing information stored in w's RTs. This is done as follows.

The object is to pool information from nodes j and w about how to reach destination D. The first step is to assess the quality of the information held by j and w, respectively. Quantitatively, j computes a routing-quality rating RQR(D,j) for each destination D in its RT:

$$RQR(D,j) = p(\max,D) - p(\min,D)$$

where $p(\max,D)$ is the largest weight in j's current list for destination D, and $p(\min,D)$ is the smallest. Computed in this way, any RQR has a minimum value of zero (nothing is known about routing to D), and a maximum of one (in which case only one, best route to D has any weight). Node j also requests the RQR(D,w) for each destination D from node w.

Now j will give more or less weight to the use of w as a route to D, according to the relative values of the two RQRS. If j had n neighbor before discovering w, then it has n+1 neighbors afterwards; and so an average weight for node w would be 1/(n+1). Node j will deviate from this average value if the two RQRS (that of j, and that of w) are different enough, as follows. Let $$x = RQR(D, w)$$
$$y = RQR(D, j)$$
$$f(x, y) = \frac{1}{n+1} + \left(1 - \frac{1}{n+1}\right)(x - y)$$

Then the new weight given to node w in j's RT for D is $$p(w, D)(\text{new}) = \begin{cases} f(x, y) & \text{if } f(x, y) > 0 \\ 0 & \text{otherwise} \end{cases}$$

This rule gives average weight to w if its RQR for D (which measures how much node w "knows" about routing to D) is the same as j's RQR for D. However, if w knows much more than j [RQR(D,w)=1, and RQR(D,j)=o], then w's new weight in j's routing table will be 100%. Finally, if w's RQR is sufficiently less than j's, it will get zero weight. In short, this rule is designed to assess the relative "wisdom" of the two nodes, regarding the task of routing to D, and to weight paths to D from j via w accordingly. The remaining weight, that is, 1 p(w,D) (new), is divided proportionally among the remaining neighbors of j, with the proportions fixed to be the same as before the discovery of w.

Given a routing table with multiple, weighted entries for each destination, there are three choices for how to route a packet towards that destination. These choices may be termed "uniform" or u routing, "regular" or r routing, and "greedy" or g routing.

Uniform routing ignores the weights in the RT, and chooses the next hop with equal probability from the nodes in the neighboring set. Uniform routing is not likely to be a good choice for routing data. However (as noted above), dummy messages seeking a lost neighbor node are routed (at the first hop) uniformly. Furthermore, it can be advantageous to emit small numbers of dummy messages even in the absence of changes in the NS. These messages serve as "noise" in the routing process. Their utility lies in that they can serve to discover good routes which would otherwise go unused, in the case that the system's RTs have settled on a different set of routes that were once the best, but are no longer so. That is, noise in routing prevents the "freezing" of the system into less-than-optimal routes. It is common in stochastic routing schemes to employ a small percentage f% of u-routed dummy messages; and in the proposed scheme such messages will also be used, with f a tunable parameter.

Regular (r) routing sends data with the probabilities given in the RTs. This is stochastic routing.

Finally, greedy (g) routing always chooses the highest weight entry for the next hop. Hence, this routing method is deterministic.

In studies of stochastic routing on fixed networks, it is common to use a significant number of dummy messages for the purpose of gathering routing information. These dummy messages are often called "agents" or "ants," the latter name coming from their nature as small objects swarming over the network, and leaving a "trail" behind them that guides other ants. In order for later ants to be able to profitably learn from earlier ants, it is important that the ants (dummy messages exploring the network) are routed with r routing. That is, they must follow the probabilities established by earlier experience. On the other hand, messages (in these studies) are typically routed using greedy routing: one chooses the best known path at any given time.

Hence, previous studies of stochastic routing on fixed networks have used r routing for dummy, exploratory messages (ants), and g routing for data. In the proposed invention, ants and data are to be combined: every data packet transmitted through the network is used to update RTs, and there are few empty (dummy) messages used purely for exploring the network. In other words, messages also act as ants. Yet, since the two are combined, they must be routed by the same rule: g or r routing.

In this invention, it is proposed to use a mixture of the two rules: h% of messages shall be routed with high priority (greedy routing, highest weight) and (100-h)% of messages shall be routed with standard priority (regular routing, according to the weights in the RTs). h is a tunable parameter. This invention employs a mixture of the two routing rules in order to allow for the benefits of both: g routing will normally give the best performance for any given message; but r routing is needed to support the learning process that the messages, collectively, are contributing to. Hence, a mixture is chosen, with the proportion of each to be determined according to the performance achievable under a given set of operating conditions.

EXAMPLE

Table 1 below shows an example of the routing table (RT) for a node, which we call the source S.

TABLE 1

|  | Neighbor 1 | Neighbor 2 | Neighbor 3 | Neighbor 4 | Neighbor 5 |
| --- | --- | --- | --- | --- | --- |
| Destination 1 | 0.1 | 0.5 | 0.1 | 0.25 | 0.05 |
| Destination 2 | 0.45 | 0.05 | 0.2 | 0.1 | 0.2 |
| Destination 3 | 0.05 | 0.4 | 0.05 | 0.35 | 0.15 |
| Destination 4 | 0.2 | 0.2 | 0.2 | 0.2 | 0.2 |
| etc. | | | | | |

In this example, the node S has five one-hop neighbors. The RT then has a "goodness index," which may be interpreted as a probability, for each neighbor and for each destination. These indices help the node to decide which neighbor to use, for each destination. For example, if S wants to send to Destination 1, Neighbor 2 is the best choice, according to the RT.

Note (NB): this goodness index is not the route-quality rating RQR.) For example, the RQR for node S and Destination 1 is 0.5−0.05=0.45, while Destination 4 has the lowest RQR of 0.

The "etc" means that, in a typical ad-hoc network, there are more than 4 destinations. That is, the network, as seen from S, is composed of S itself (one node), plus S's neighbors (here 5 more nodes), plus all the rest, each of which may have a row in the RT. "Greedy routing" would always choose the neighbor with the highest goodness index. That is, given a destination D, scan the corresponding row of the RT, and pick the neighbor with highest index.

Since the indices in each row sum to 1, they can be viewed as probabilities. "Regular routing" then says, given a destination D, scan the corresponding row of the RT, and choose the first-hop neighbor with a probability which is equal to the index for that neighbor in the row. That is, if S uses regular routing and wants to send to Destination 1, S needs an algorithm (this is standard) that chooses Neighbor 1 with probability 0.1, Neighbor 2 with probability 0.5, etc.

When there are many possible choices of next hop for each destination, and a weight or probability for each one, then we say that the resulting routing scheme uses "stochastic routing."

Most (but not all) schemes using stochastic routing will use greedy routing for messages, and regular routing for "exploration packets" or "ants". The former carry data, while the latter are used only to explore the net and gather information for use in updating the RTs. The inventive scheme asks data packets to take on both jobs. The prescription for how the data packets shall be routed is new: h% shall use greedy routing, and (1-h)% then use regular routing. This way, one gets both good delivery and good exploration, while having low overhead by using very few pure-exploration packets.

If the node S loses a neighbor, it will lose a whole column of the RT. Then node S must do two things:

(i) readjust the weights in the remaining columns of the existing rows, so that they again sum to 1.

(ii) add a new row to the table, since the lost node becomes a new Destination. With no information about how to find this lost neighbor, node S fills the new row with equal weights (as illustrated for Destination 4 in the example RT). However, the inventive method requires S to send out dummy messages looking for the lost neighbor.

If node S discovers a new neighbor (there are standard procedures for this; it is not a part of the present invention), a new column must be added (and, if the new neighbor was a Destination before, remove that row). Adding a new column requires adjusting every row in the RT. Also, the new neighbor (call it NN) has just found a new neighbor, S. Hence both nodes must update all the rows of their RTs. The inventive method has a new and nice way of pooling information from both nodes, the new neighbor NN and S, so as to make the best use of their combined routing information, using RQRs.

All of the new (and other) features of the present invention described here can be used with hardwired networks, whenever such networks have sufficiently dynamic operating conditions, such as changing traffic patterns, or nodes or links changing their connectivity, so that adaptive schemes such as stochastic routing are beneficial.

There is also an important case, termed "mesh networks," that is intermediate between the hardwired case and the ad-hoc network. Mesh networks use multi-hop routing among wireless nodes, but the nodes are not generally mobile. Instead they are fixed to buildings. Such networks can advantageously use algorithms similar to those used by ad-hoc networks. Such algorithms allow mesh networks to dispense with central control, even while allowing nodes (say, at individual homes) to enter and leave the network in an unplanned fashion. That is, mesh networks are most attractive when they support a self-healing mechanism, very much like that used with AHN. The methods described in this invention could be profitably applied to mesh networks. Examples of companies now offering mesh-network technology include MeshNetworks, SkyPilot, CoWave, and Ember.

It is most like that ad-hoc routing will find its widest applicability when used in combination with fixed networks. Isolated, mobile wireless networks are not likely to be of use except in special cases, but multi-hop and wireless connectivity promises to be a useful way to extend the reach and capacity of fixed networks with base stations. Thus, the likeliest use of AHNs will involve routing to and from a fixed gateway node, or base station. The present invention will be useful for this case, and will almost certainly perform better for this case than for the "pure" case of only routing between mobile nodes within the AHN. This is because it is less challenging to route to a fixed gateway than to route to a large number of mobile destinations. Thus, fixed infrastructure, extended at the "edge" by multi-hop wireless routing, which in turn uses stochastic routing as described here, is a very promising scenario for future telecommunications systems.

Location-aided routing also promises to perform well in such situations. In the event that it becomes practical to support the provision of real-time positioning information on low-cost, mobile, handheld devices, then such information should be combined with stochastic routing to give the simplest and most reliable support for multi-hop ad-hoc routing. More specifically, the present invention could be combined with location information to give even more effective routing.

The invention claimed is:

1. A method for routing messages from a source node (S) to a destination node in a dynamic network, said source node including a routing table, each row in the routing table representing a possible destination node (D) for a data message transmitted from the source node (S), and each row in the routing table including one probability value p(k,D) for each neighbor node (k) of the source node (S), the method comprising:

updating the probability values with quality measurements taken each time a data message is sent from the source node (S) to the destination node (D);

routing a tunable predefined percentage of the messages by choosing the neighbor node with the highest probability value in the row for a destination node (D) in the routing table; and routing the other messages by distributing the messages among the neighbor nodes according to the probability values given in the same row in the routing table, wherein the probability values of using a specific neighbor node (k) of the source node (S) for transmitting data from the source node (S) to the destination node (D) are updated according to the following expression:

$$\frac{p(k, D)(old) + \delta}{1 + \delta}$$

where $\delta$ represents the measured quality of a path through the node k, and p(k,D)(old) represents the old probability value amount of using the node (k) for transmitting data from the source node (S) to the destination node (D), and the remaining probability values in the routing table are adjusted in such a way that all the probability values in each row of the routing table sum to one.

2. The method of claim 1 wherein the quality measures of the path taken are represented by hops and/or time delays.

3. A method for routing messages from a source node (S) to a destination node in a dynamic network, said source node including a routing table, each row in the routing table representing a possible destination node (D) for a data message transmitted from the source node (S), and each row in the routing table including one probability value p(k,D) for each neighbor node (k) of the source node (S), the method comprising:

updating the probability values with quality measurements taken each time a data message is sent from the source node (S) to the destination node (D);

routing a tunable predefined percentage of the messages by choosing the neighbor node with the highest probability value in the row for a destination node (D) in the routing table;

routing the other messages by distributing the messages among the neighbor nodes according to the probability values given in the same row in the routing table; and at the detection of a gain of a new neighbor node (j), for both the new neighbor node (j) and the source node (S), computing one route quality rating (RQR(D,j) and RQR (D,S)) for each possible destination node (D), based on the maximum probability value and minimum probability value for each destination node (D), and for all possible destination nodes (D), computing a new probability value for the new neighbor node based on the route quality rating for the neighbor node (j) and the source node (S) and the number of its associated neighbor nodes.

4. The method of claim 3 wherein the route quality rating is equal to a maximum probability value minus a minimum probability value.

5. The method of claim 4 wherein the new probability value for the new neighbor node (j) is:

$$\begin{cases} \frac{1}{n+1} + \left(1 - \frac{1}{n+1}\right)(x-y) & \text{if said expression} > 0 \\ 0 & \text{otherwise} \end{cases}$$

where x is the quality rating of the new neighbor node, y is the quality rating of the source node in question and n is the number of neighbor nodes before gaining the new neighbor node.

6. A method for routing messages from a source node (S) to a destination node (D) in a dynamic network using a routing table having a probability value p(k,D) for each neighbor node (k) of the source node (S), the method comprising:

routing a tunable predefined percentage of the messages to a neighbor node having a highest probability value in a routing table;

routing a remaining percentage of messages among neighbor nodes according to a probability value associated with each neighbor node in the routing table; and updating the probability values with quality measurements taken each time a data message is sent from the source node (S) to the destination node (D), wherein the probability values of using a specific neighbor node (k) of the source node (S) for transmitting data from the source node (S) to the destination node (D) are updated according to the following expression:

$$\frac{p(k, D)(old) + \delta}{1 + \delta}$$

where δ represents the measured quality of a path through the node k, and p(k,D)(old) represents the old probability value amount of using said node (k) for transmitting data from the source node (S) to the destination node (D), and the remaining probability values in the routing table are adjusted in such a way that all the probability values in each row of the routing table sum to one.

7. The method of claim 6 wherein the quality measures of the path taken are represented by at least one of hops or time delays.

8. A method for routing messages from a source node (S) to a destination node (D) in a dynamic network using a routing table having a probability value p(k,D) for each neighbor node (k) of the source node (S), the method comprising:

routing a tunable predefined percentage of the messages to a neighbor node having a highest probability value in a routing table;

routing a remaining percentage of messages among neighbor nodes according to a probability value associated with each neighbor node in the routing table; and at the detection of a gain of a new neighbor node (j), for both the new neighbor node (j) and the source node (S), computing one route quality rating (RQR(D,j) and RQR (D,S)) for each possible destination node (D), based on the maximum probability value and minimum probability value for each destination node (D), and for all possible destination nodes (D), computing a new probability value for the new neighbor node based on the route quality rating for the neighbor node (j) and the source node (S) and the number of its associated neighbor nodes.

9. The method of claim 8 wherein the route quality rating is equal to a maximum probability value minus a minimum probability value.

10. The method of claim 9 wherein the new probability value for the new neighbor node (j) is:

$$\begin{cases} \frac{1}{n+1} + \left(1 - \frac{1}{n+1}\right)(x-y) & \text{if said expression} > 0 \\ 0 & \text{otherwise} \end{cases}$$

where x is the quality rating of the new neighbor node, y is the quality rating of the source node in question and n is the number of neighbor nodes before gaining the new neighbor node.

* * * * *